United States Patent
Murrells et al.

(10) Patent No.: US 10,778,674 B2
(45) Date of Patent: Sep. 15, 2020

(54) VOICE AUTHENTICATION AND SETUP FOR WIRELESS MEDIA RENDERING SYSTEM

(71) Applicant: D&M Holdings, Inc., Kanagawa (JP)

(72) Inventors: Nicholas Murrells, San Diego, CA (US); Robert M. Kilgore, Brooklyn, NY (US)

(73) Assignee: D&M Holdings, Inc., Kanagawa (JP)

( * ) Notice: Subject to any disclaimer, the term of this patent is extended or adjusted under 35 U.S.C. 154(b) by 179 days.

(21) Appl. No.: 15/883,298

(22) Filed: Jan. 30, 2018

(65) Prior Publication Data

US 2019/0238534 A1   Aug. 1, 2019

(51) Int. Cl.
| | |
|---|---|
| *G06F 21/00* | (2013.01) |
| *H04L 29/06* | (2006.01) |
| *G10L 17/00* | (2013.01) |
| *G06F 21/32* | (2013.01) |
| *H04W 12/06* | (2009.01) |
| *H04W 76/11* | (2018.01) |
| *H04W 12/00* | (2009.01) |
| *H04W 84/12* | (2009.01) |
| *H04L 9/32* | (2006.01) |

(52) U.S. Cl.
CPC .......... *H04L 63/0861* (2013.01); *G06F 21/32* (2013.01); *G10L 17/005* (2013.01); *H04W 12/003* (2019.01); *H04W 12/06* (2013.01); *H04W 76/11* (2018.02); *H04L 9/3231* (2013.01); *H04W 84/12* (2013.01)

(58) Field of Classification Search
CPC ... H04L 63/0861; H04W 76/11; H04W 12/06; G06F 21/32; G10L 17/005
See application file for complete search history.

(56) References Cited

U.S. PATENT DOCUMENTS

| | | | |
|---|---|---|---|
| 7,184,960 B2 | 2/2007 | Deisher et al. | |
| 7,564,369 B1 * | 7/2009 | Adams | G08C 23/04 340/12.53 |
| 7,957,974 B2 | 6/2011 | Cho et al. | |
| 8,121,635 B1 | 2/2012 | Fujisaki | |

(Continued)

OTHER PUBLICATIONS

International Search Report and Written Opinion for PCT/US19/15753, dated Apr. 24, 2019.

*Primary Examiner* — John B King
*Assistant Examiner* — Darshan I Dhruv
(74) *Attorney, Agent, or Firm* — Peter A. Nieves; Sheehan Phiney Bass & Green PA (57) ABSTRACT

A system and method for configuring a media rendering device of a media rendering system in a WLAN is disclosed. A second device is activated, and detected by a first device. The first and second devices establish a communication channel. The first device accesses biometric user data of a first user of the media rendering system, and records an audio voice phrase of a user of the second device. The system analyzes the audio voice phrase of the user of the second device to compare the audio voice phrase of the user of the second device to the biometric user data of the first user of the media rendering system. The system authenticates the audio voice phrase with respect to the biometric user data and configures the second device to render media according to a first user profile of the first user of the media rendering system.

20 Claims, 5 Drawing Sheets

(56) References Cited

U.S. PATENT DOCUMENTS

| | | | |
|---|---|---|---|
| 8,196,064 B2* | 6/2012 | Krzyzanowski | H04L 12/2816 715/711 |
| 8,250,387 B2 | 8/2012 | Tsukamoto | |
| 8,340,975 B1* | 12/2012 | Rosenberger | G10L 15/22 704/270 |
| 8,682,667 B2 | 3/2014 | Haughay | |
| 8,959,360 B1* | 2/2015 | Barra | G06F 21/629 713/186 |
| 9,160,743 B2 | 10/2015 | Anantharaman | |
| 9,230,560 B2 | 1/2016 | Ehsani et al. | |
| 2004/0133689 A1 | 7/2004 | Vasisht | |
| 2006/0248332 A1* | 11/2006 | Kim | H04L 63/102 713/155 |
| 2007/0111568 A1 | 5/2007 | Ferrari et al. | |
| 2010/0321151 A1* | 12/2010 | Matsuura | G06F 21/32 340/5.52 |
| 2012/0216260 A1 | 8/2012 | Crawford et al. | |
| 2012/0240195 A1* | 9/2012 | Weiss | H04L 63/107 726/4 |
| 2013/0173794 A1 | 7/2013 | Agerbak et al. | |
| 2014/0046664 A1* | 2/2014 | Sarkar | H04L 63/0869 704/246 |
| 2014/0167931 A1 | 6/2014 | Lee et al. | |
| 2014/0230018 A1* | 8/2014 | Anantharaman | H04L 63/0861 726/4 |
| 2014/0364056 A1* | 12/2014 | Belk | H04N 21/44218 455/41.1 |
| 2014/0379339 A1 | 12/2014 | Timem et al. | |
| 2015/0162006 A1 | 6/2015 | Kummer | |
| 2015/0186636 A1 | 7/2015 | Tharappel et al. | |
| 2016/0335041 A1 | 11/2016 | Wachter et al. | |
| 2017/0078305 A1 | 3/2017 | Murrells et al. | |
| 2017/0302976 A1* | 10/2017 | Puttagunta | H04N 21/6125 |
| 2018/0233136 A1* | 8/2018 | Torok | G06F 3/167 |

* cited by examiner

VOICE AUTHENTICATION AND SETUP FOR WIRELESS MEDIA RENDERING SYSTEM

FIELD OF THE INVENTION

The present invention relates to wireless network devices, and more particularly, is related to configuration of wireless media rendering devices.

BACKGROUND OF THE INVENTION

Many premises (homes, businesses) have local area networks (LAN), for example, wireless local area networks (WLAN), such as WiFi or BlueTooth wireless networks. An exemplary wireless media rendering system may be in communication with the WLAN of a premises. The wireless media rendering system includes one or more wireless devices, and additional devices may be added to a provisioned system. Adding a device to the system has generally been a tedious and/or frustrating process for users of the system, where the user is queried for specifics of the WLAN, such as network identifiers and security keys. Furthermore, in the case of wireless media rendering systems, once the device is able to communicate via the WLAN, a second round of provisioning may be needed for the device to interact with the media rendering system in a desired manner.

While previous devices may be designed to self-configure to a detected network upon initial start-up, there are scenarios where this may lead to undesirable results. For example, in a multi-residence dwelling, such as an apartment building, a newly powered up device may detect the WLAN of a neighbor, so it would be undesirable for the device to auto-configure to the WLAN of the neighbor. Similarly, it would be undesirable for a device in a media rendering system to self-configure to join a media rendering system of a neighbor. Therefore, there is a need in the industry to address one or more of the abovementioned shortcomings.

SUMMARY OF THE INVENTION

Embodiments of the present invention provide for a voice authentication and setup for a wireless media rendering system. Briefly described, the present invention is directed to a system and method for configuring a media rendering device of a media rendering system in a WLAN. A second device is activated, and detected by a first device. The first and second devices establish a communication channel. The first device accesses biometric user data of a first user of the media rendering system, and records an audio voice phrase of a user of the second device. The system analyzes the audio voice phrase of the user of the second device to compare the audio voice phrase of the user of the second device to the biometric user data of the first user of the media rendering system. The system authenticates the audio voice phrase with respect to the biometric user data and configures the second device to render media according to a first user profile of the first user of the media rendering system.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Reference will now be made in detail to embodiments of the present invention, examples of which are illustrated in the accompanying drawings. Wherever possible, the same reference numbers are used in the drawings and the description to refer to the same or like parts.

As used within this disclosure, a "network" refers to a communications network configured to exchange binary formatted information between two or more addressable networked devices via one or more data routers implementing a data routing protocol, for example, an IP network.

As used within this disclosure, "network credentials" may refer to, but is not limited to, the type of network protocol, the network name for example an SSID (Service Set Identifier), the type of security used by that network (WEP, WPA, etc.), and a password for that network.

As used within this disclosure, a "player" refers to an exemplary audio device that receives a data signal, for example, a powered speaker, preamp, amplifier, receiver, etc. The term player is not intended to convey that the audio device is capable, on its own, of rendering an audio signal or audio source.

As used within this disclosure, "media" refers to audio and/or video content either stored on a storage medium, such as a disk drive or digital disk, or streamed from a media server. Media may refer to analog and/or digitally formatted data. A specific recorded performance is referred to as a media program.

As used within this disclosure, an originating provider of media, either streamed or locally stored, is referred to as a "media source." Examples of a media source include a music and/or video server, an internet radio station, a streaming service, or a cache of media files.

As used within this disclosure, "rendering" refers to playback of a media program by a media player, also referred to herein as a "rendering device." Examples of rendering devices include, but are not limited to, an mp3 player, a tablet computer, a portable stereo, a home entertainment system, a portable video player, a smart phone, a laptop or desktop computer, and a mobile entertainment system. A rendering device generally has at least one audio transducer (speaker) used to render the media audio portion.

As used within this disclosure, a "controller" refers to a hand held device or an application running on a hand held device configured to interact with a media rendering device, and/or with one or more groups of media rendering devices, where each of one or more groups is configured to render the same or different media programs. The controller may interact with the media rendering device by issuing commands to adjust one or more operating parameters on the media rendering device, and/or to display operational status of the media rendering device. Examples of a hand held device include, but are not limited to a smart phone or tablet computer.

As used within this disclosure, a "group" generally refers to a collection of one or more media rendering devices that are configured to collectively render a single channel or multi-channel media program, for example, a stereo pair, a stereo pair with subwoofer (2.1), a surround system including front, rear, center, and subwoofer speakers (5.1, 7.1, 7.2), among other collections. Each device in the group may be configured to render one or more channels of the media program.

As used within this disclosure "joining" generally refers to associating a media rendering device with a group. A group with two members may be referred to herein as a "pair", and "pairing" indicates joining a first audio device to a second audio device to form the pair. In particular, as used herein joining and/or pairing refers to a logical association via a network, as distinguished from an electrical connection, for example, via audio and/or speaker cables.

As used within this disclosure, a "subwoofer" generally refers to an audio device configured to render a specific portion of audio bandwidth, typically frequencies below a specified ceiling (a "crossover frequency"). A subwoofer may be configured to render a received audio channel, or may be configured to derive its own channel from one or more received audio channels, for example, to derive a low frequency audio channel from left and right channels of a stereo audio signal. A subwoofer may be paired or joined with one or more speakers. For example, the subwoofer may be joined to a group of one speaker, two speakers which are configured themselves to be a stereo pair, three speakers, etc. Typically a group in a home theater environment includes a 2.1, 3.1, 4.1, or 5.1 (most common) configuration with 2-5 speakers (indicated by the digit before the decimal point) and one subwoofer (indicated by the digit after the decimal point). A typical home theater is 5 speakers and a subwoofer (0.1) consisting of left-front, center, right-front, surround-left, surround-right and the subwoofer. Optionally, to provide more bass (in a larger room for example) one may add multiple subwoofers. As used herein, a group may refer to all of these options, among others.

As used within this disclosure, a "user" refers to a person consuming media from a media rendering device or system, and/or a person operating a controller for the media rendering device or system.

As used within this disclosure, a local device, such as a server, refers to a network element directly connected to a local area network (LAN), while a remote device refers to an item that may be in communication with local network elements, for example, via the internet, but is not directly connected to the LAN. Examples of a LAN include a wireless (WiFi) LAN or a wired LAN, for example, connected via Ethernet cables.

As used within this disclosure, a "playlist" is a modifiable data structure containing an ordered list of media, or an ordered list of references to media. A playlist may be stored, for example, on a rendering device or a server, or within a storage medium, such as a hard drive, thumb drive, or optical disc. A playlist may be modified to add, remove, and/or re-order media or media references. Since playlists containing media references do not contain audio or video content, they are generally small in size and therefore readily transportable. A display playlist is a text listing of media in a playlist, and may include a subset of identifying parameters of a media, such as title, artist, duration, and date, among others. A play queue refers to a playlist that is currently being rendered by a rendering device. The head of the play queue refers to the next media file to be rendered after the currently rendered media program, while the tail of the play queue refers to the location of the play queue indicating the final media in the play queue to be rendered.

As used within this disclosure, "streaming" refers to a process of real-time transmitting of a media program by a source to a rendering device. The rendering device may begin rendering the media before the entire program has been transmitted. Streaming is generally transitory, such that the streamed data is not retained after it has been rendered. Portions of a received stream may be buffered for rendering, for example, to ensure rendering is uninterrupted during short interruptions of the streamed transmission. In contrast, a downloaded digital multimedia file is generally received in its entirety before it may be rendered. A downloaded digital multimedia file is generally retained in a memory for subsequent rendering, while a streamed file is generally re-streamed for subsequent renderings. "Streaming a song" is shorthand for streaming audio media.

As used within this disclosure, "GUI" is a graphical user interface, and in particular, may be a touch-screen interface or an on-screen TV based interface. A graphical user interface or GUI, sometimes pronounced /ˈquːi/("gooey") is a type of interface that allows users to interact with electronic devices through graphical objects, or icons, and visual indicators such as secondary notation, referred to herein as "objects," as opposed to text-based interfaces, typed command labels or text navigation. It should be noted a graphical icon may include text, or may entirely consist of text. An ordered list of objects in a GUI may be referred to as a "menu." Menus may be stationary, may drop down from top of the display (a "drop-down menu"), or may pop up to fill the screen or a portion of the screen when an object is selected (a "pop-up menu"). The actions in the GUI are usually performed through direct manipulation of the objects. As used herein, "selecting" refers to touching an object, for example with a finger or stylus. Selecting may also be accomplished without a touch screen, for example, with a TV UI using a remote control and an item on screen which is highlighted then selected by the user pressing a button on the remote control.

A "drag-and-drop" operation refers to selecting a first object with a touch of the touchscreen, and moving the finger/stylus from the first object to another location (often with a ghost or outline of the object tracking the movement) corresponding to a second object. The second object may become highlighted when the ghost is dragged over it, indicating the second object is able to "receive" the first object. The drag-and-drop operation may be thought of as providing the dragged object as an input to the second object. The operation resulting from the drag-and-drop operation is generally generation of a command to a media rendering device controlled by the controller, the scope of which may depend upon context or the mode of the display during the operation.

An object refers to an item represented by a graphical icon or visual indicator, for example, a media source, a media file, or a media rendering device.

A system enabled device is a device that adheres to a protocol unique to a wireless media rendering system. As used herein, a "first system enabled device" refers to a system enabled device that is the first system enabled device of a wireless media rendering system to be provisioned within a WLAN. It is desirable that provisioning of the first system enabled device is different from provisioning of subsequent system enabled devices, in particular, that provisioning of subsequent system enabled devices is simpler than provisioning of the first system enabled device. For example, the media rendering system may operate in a WLAN with non-system networked devices, and the system enabled devices may communicate privately within the WLAN, for example via a proprietary protocol and/or a private communication channel either provided by the WLAN or independent of the WLAN. System enabled devices may also communicate with each other using a hard-wired communication connection.

Exemplary embodiments of the present invention are directed to methods and systems in a communication network configured to negotiate between a new network enabled media rendering device and a previously configured network enabled media rendering device of a media rendering system with stored voice biometric data. In particular, the media rendering system is directed, when provisioning a new media rendering device, to distinguish between a first previously configured network media rendering device in the communication network and a second previously configured network media rendering device in a second network that may have an overlapping geographic range, for example, the WLAN of a neighbor in an apartment building, so that the new media rendering device does not join the neighboring system on the neighboring WLAN. Embodiments provide for the previously configured network media rendering device accessing or obtaining biometric data (for example, from a soft access point in the previously configured device), and for configuring the new media rendering device to operate within the media rendering system without a stringent security procedure on the part of the user. For example, the security may be established based upon basic recognition of the voice of the user, perhaps without repetition of a security phrase.

Figure 1:
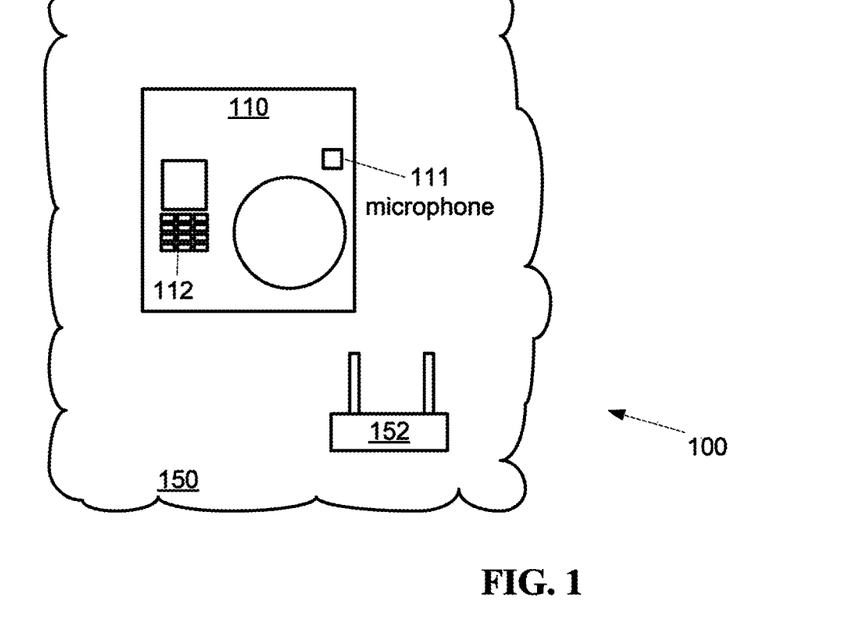
FIG. 1 is a schematic diagram of a media rendering system showing a first embodiment of media rendering device starting operation in the vicinity of a WLAN.

FIG. 1 is a schematic diagram of a first embodiment of a wireless media rendering system 100 where a first system enabled device 110 is activated. In a first scenario shown by FIG. 1, the first system enabled device 110 detects a WLAN 150 provided by an access point 152. The first system enabled device 110 attempts to determine if there are other system enabled devices present. If no other system enabled device is detected, the first system enabled device 110 assumes it is the first system enabled device in the wireless media rendering system 100 and proceeds with an initial system setup procedure, described in detail below (see FIG. 3).

The first system enabled device 110 is configured to communicate via the WLAN 150. For example, the first system enabled device 110 may be manually configured to communicate with the access point 152, or the first system enabled device 110 may be configured to communicate via other means, for example, via a WiFi Protected Setup (WPS) on the access point 152.

The first system enabled device 110 may be configured to operate in a manner according to a set of user preferences, which are collectively referred to herein as a user profile. The first system enabled device 110 may initially operate from a default user profile, which a user of the first system enabled device 110 may customize to her liking. For example, a user profile may contain user preferences regarding configuration parameters for rendering devices and/or media preferences. The user profile may contain user identification information and include information regarding media preferences, a list of devices used by the user, one or more media playlists, and/or a list of media streaming services subscribed to by the user, as well as other media selection and/or media rendering preferences.

Figure 2:
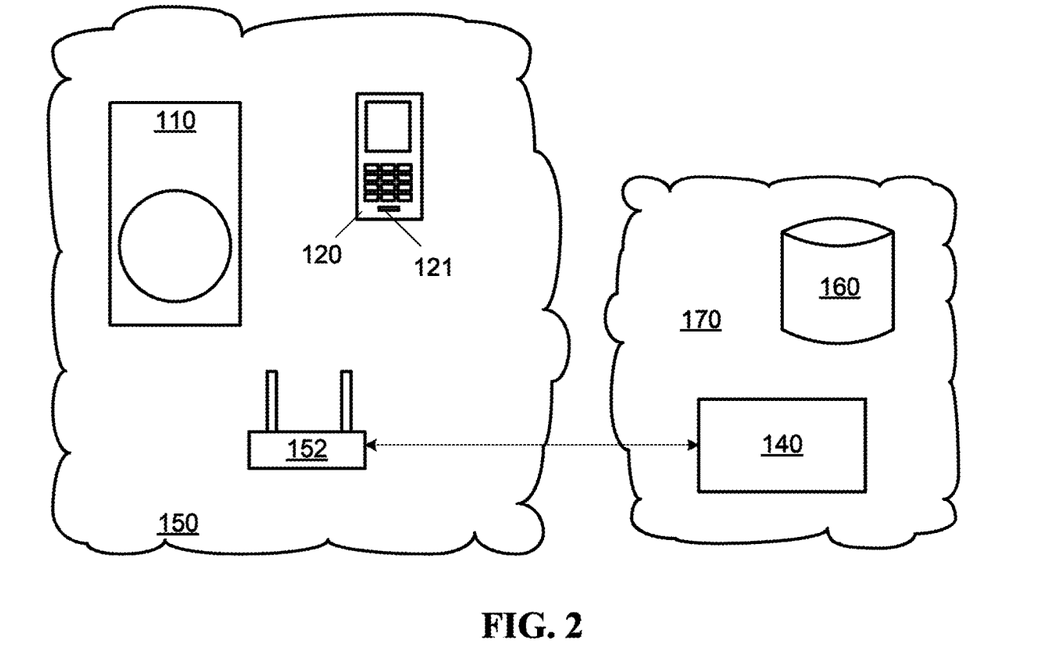
FIG. 2 is a schematic diagram of a media rendering system showing a second embodiment of media rendering device starting operation in the vicinity of a WLAN.

The user may enter her preferences into the first system enabled device 110 in a number of ways, for example, by manual configuration via a user interface 112 on the first system enabled device 110 itself, or an application (or "app") where the first system enabled device 110 stores the profile in an internal memory. FIG. 2 shows a second embodiment similar to the first embodiment, except under the second embodiment an application (or "app") on a smart phone 120 or other personal computing device on the WLAN 150 may be configured to collect and store user preferences as a user profile, and then convey the user profile to the first system enabled device 110. The first system enabled device 110 and/or the smart phone 120 may convey the user profile to a remote server 140, for example in the cloud 170, where the user profile is stored in cloud storage 160. The user profile may also be stored on the smart phone 120.

Under both the first embodiment and the second embodiment, the first system enabled device 110 may obtain a recording of the voice of the user, for example, an audio pass phrase uttered by the user. For example, under the first embodiment, the first system enabled device 110 may include a microphone 111 (FIG. 1A) and prompt the first user to utter the pass phrase. Under the second embodiment, the first system enabled device 110 may be in communication with an external device in the WLAN with a microphone, for example, the smart phone 120 with a microphone 121. The pass phrase may be stored by the smart phone 120, the first system enabled device 110, and/or in cloud storage 160.

The pass phrase may be a specific phrase to be used for later matching with a subsequent utterance of the same phrase, or the pass phrase may include a selection of vowel tones and/or sibilance types to provide for recognition of the voice subsequently speaking a phrase other than the pass phrase. The pass phrase may be uttered once, or repeated for analysis purposes. Alternatively, and/or in addition, the pass phrase may include different types of audio information that may be leveraged via biometrics as identifying characteristics, for example, pitch, timbre, tonality, and/or inflection, and may be non-verbal, for example, a whistled or hummed sequence of musical notes.

The pass phrase may be stored by the first system enabled device 110 under the first and second embodiments, or may be stored in remote storage, such as cloud storage 160 under the second embodiment. The pass phrase may be stored as audio, for example, as a digitally sampled recording of the pass phrase audio, or may be stored as an analysis file, for example a biometric analysis of the pass phrase. The analysis file may or may not include the audio data of the pass phrase. Under the first and/or second embodiment, the analysis file may be produced by the first system enabled device 110. Alternatively, under the second embodiment, the analysis file may be produced by the smart phone 120 and/or the remote server 140.

Figure 3:
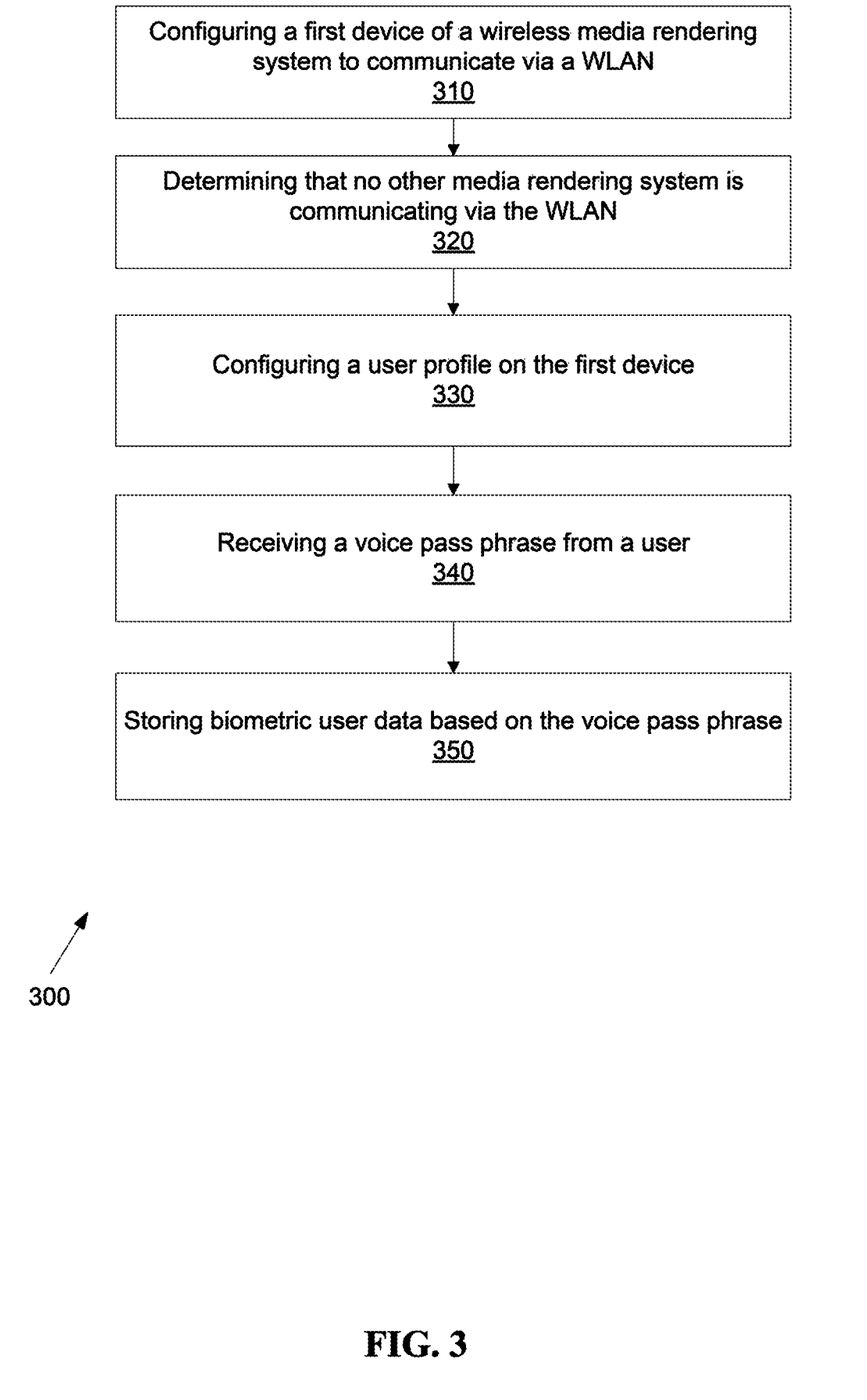
FIG. 3 is a flowchart of a method for configuring a first system enabled device of a media rendering system of FIG. 1 or FIG. 2.

FIG. 3 shows a flowchart 300 indicating an exemplary method for how a first system enabled device 110 may be configured for WLAN operation and for creating a user profile. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The first system enabled device 110 is configured to communicate via a WLAN 150, as shown by block 310. The WLAN 150 may already be present, for example, provided by the access point 152, in which case the first system enabled device 110 may be configured according to the WLAN 150 parameters. As noted above, the first system enabled device 110 may be configured to communicate via the WLAN 150 in a number of ways, including by manually entering system parameters, for example via a GUI of the first system enabled device, via WPS, or by other means. If the WLAN 150 is not present, the first system enabled device 110 may set up the WLAN 150, serving as an access point for the WLAN 150. The WLAN 150 may be a "hard" access point, serving devices whether or not they are part of the wireless media rendering system 100, or a "soft" access point, only available to devices for the wireless media rendering system 100.

The first system enabled device 110 determines that no other media rendering system device is communicating via the WLAN 150, as shown by block 320. For example, if there was no previous WLAN 150, the first system enabled device 110 may assume no other wireless media rendering system is present. In the case of an existing WLAN 150, the first system enabled device 110 may perform a discovery procedure, for example, a network query, to detect other system enabled devices.

A user profile is configured on the first system enabled device 110, as shown by block 330. For example, the user profile may include one or more user preferences regarding configuration of the wireless media rendering system 100 itself, and/or preferences regarding media to be rendered by the wireless media rendering system 100. The user profile may be configured via the smart phone 120, for example, via drag-and-drop operations on a GUI provided by an application hosted on the smart phone 120.

As shown by block 340, the first system enabled device 110 receives a voice pass phrase from the user, for example by capturing an audio recording of the voice of the user after prompting the user to utter the pass phrase. The first system enabled device 110 may include a microphone 111 to record the pass phrase, or the first system enabled device 110 may receive the previously recorded pass phrase from another device communicating on the WLAN 150, for example, a smart phone 120. The first system enabled device 110 may then analyze the recorded audio of the pass phrase to produce at least one biometric data file that may be used to identify whether subsequent recorded utterances were from the same user. The biometric user data based on the voice pass phrase is stored, as shown by block 350.

Figure 4:
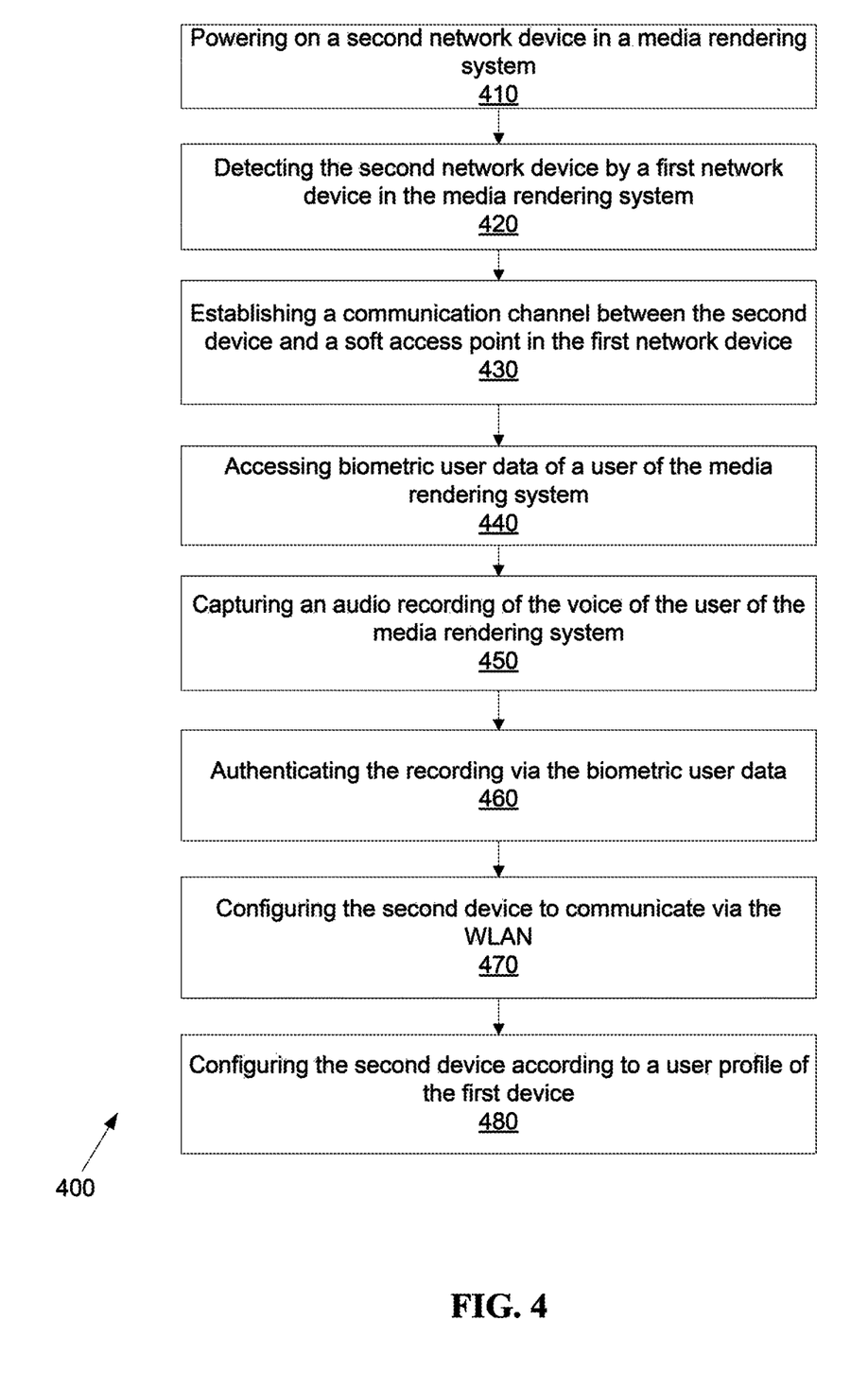
FIG. 4 is a flowchart of a method for configuring a second system enabled device of a media rendering system FIG. 1 or FIG. 2.
Figure 6:
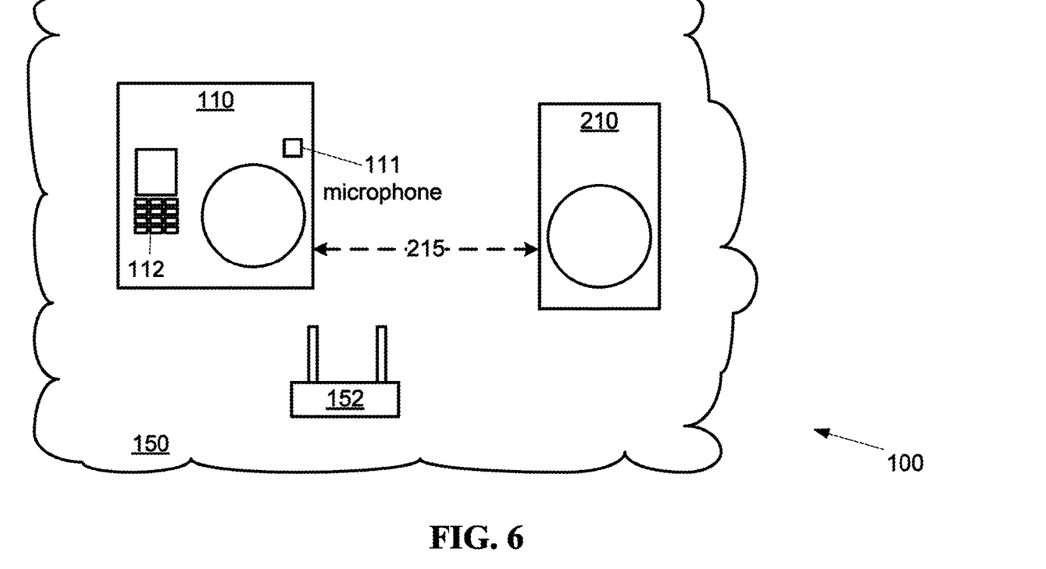
FIG. 6 is a schematic diagram showing the system of FIG. 1 where a second media rendering device is starting operation in the vicinity of the WLAN.
Figure 7:
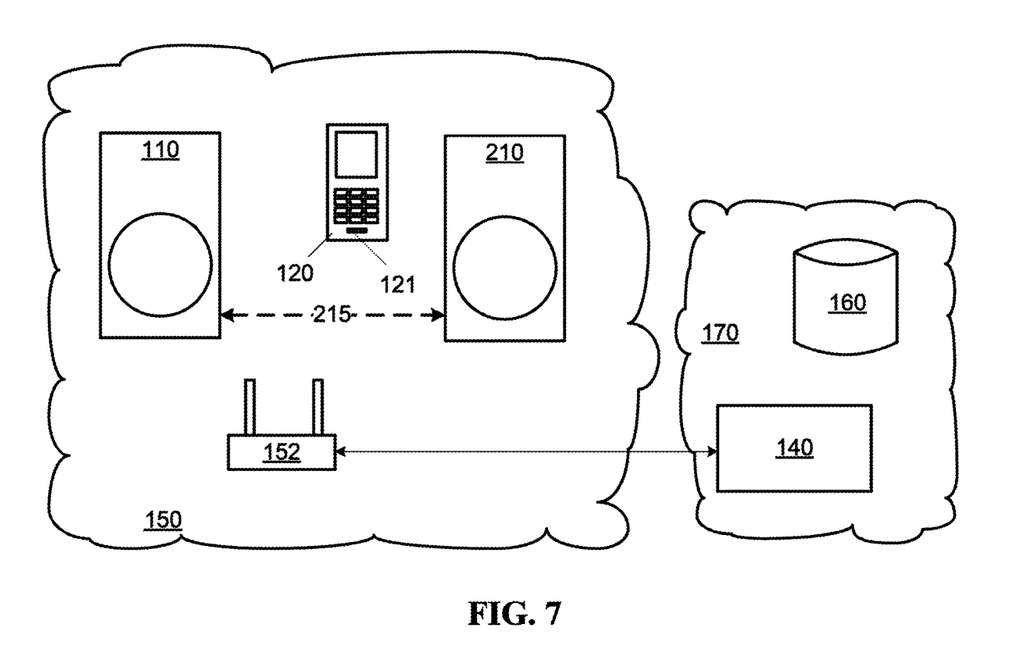
FIG. 7 is a schematic diagram showing the system of FIG. 2 where a second media rendering device is starting operation in the vicinity of the WLAN.

As the above described network configuration and configuration of a user profile for the wireless media rendering system 100 may be tedious and/or time consuming, it is desirable that each only be performed once for the first system enabled device 110, and not for subsequent system enabled devices for the wireless media rendering system 100. Therefore, once the first system enabled device 110 is configured, subsequent system enabled devices use a secondary system setup procedure. An exemplary first embodiment for a method 400 for network and user profile configuration for a second system enabled device 210 after the first system enabled device 110 is configured is described below. The method 400 may be performed by either the wireless media rendering system 100 of the first embodiment, as shown by FIG. 6, or the wireless media rendering system 100 of the second embodiment, as shown by FIG. 7.

A second network media rendering device 210 in a wireless media rendering system 100 is powered on, as shown by block 410. The first system enabled device 110 detects the second system enabled device 210 in the wireless media rendering system 100, as shown by block 430. For example, the first system enabled device 110 may provide a soft access point configured to detect a start-up state (for example, a boot state) of the newly powered-on second system enabled device 210. Alternatively, the first system enabled device 110 may establish connection to the newly powered-on second system enabled device 210 via an ad hoc network, for example, but not limited to Bluetooth, BLE, or ZigBee. A communication channel 215 is established between the second system enabled device 210 and the soft access point in the first system enabled device 110, as shown by block 430. For example, the communication channel 215 may provide for communication between the first system enabled device 110 and the second system enabled device 210. It may be desirable for the communication channel 215 to be configured for use via a communication protocol proprietary to the media rendering system 100 so only media rendering system devices may communicate over the communication channel 215. Biometric user data of a user of the wireless media rendering system 100 is accessed, as shown by block 440. For example, the first system enabled device 110 may access the biometric user data from internal storage, or may access and/or retrieve the biometric user data via the WLAN 150 from the smart phone 120 or the remote server 140.

An audio recording of the voice of the user of the media rendering system is recorded, as shown in block 450. This is a different audio recording from the recording of the pass phrase of block 340 (FIG. 3). The microphone on one or more networked devices may be used to collect voice characteristics by a device in the system. For example, the first system enabled device 110 may provide a visual or audio prompt to a user of the second system enabled device 210 (who was presumably present to power up the second media rendering device) to utter a pass phrase. The wireless media rendering system 100 records the pass phrase. For example the pass phrase may be recorded by a microphone 111 in the first system enabled device 110, by a microphone 121 in the smart phone 120, or by another microphone equipped device (not shown) in the wireless media rendering system 100, possibly a microphone (not shown) in the second system enabled device 210.

The biometric user data (see block 350 of FIG. 3) is used to authenticate the recording, as shown by block 460. The authentication may be performed by one or more devices in the system, or may be performed externally to the wireless media rendering system 100, for example, via the cloud server 140. The recording may be processed to derive the recording biometric data, which is then compared to the stored biometric data, for example, by the first system enabled device 110, the smart phone 120, and/or the cloud server 140. The comparison may yield one or more confidence parameters indicating degrees of confidence that the voice of the recording matches the voice of the stored biometric data. The wireless media rendering system 100 may be configured to compare the confidence parameter with one or more predetermined confidence thresholds, such that a match is declared only if the one or more confidence parameters meets or exceeds some or all of the one or more confidence thresholds. Once the recording is authenticated, the system assumes the second system enabled device 210 may be integrated into the wireless media rendering system 100.

The wireless media rendering system 100 is configured so the second system enabled device 210 may communicate via the WLAN 150, as shown by block 470. This may be accomplished in one of several ways. For example, the first system enabled device 110 may provide the second system enabled device 210 with network credentials for the WLAN 150 via the communication channel 215. The second system enabled device 210 may then set its WLAN network configuration parameters according to the network credentials and establish communications via the WLAN 150. The first system enabled device 110 may provide the second system enabled device 210 with a security key/token, so that the first system enabled device 110 may authenticate the second system enabled device 210 via the WLAN 150, where after the first system enabled device 110 and the second system enabled device 210 may use the WLAN 150 for subsequent communication.

The second system enabled device 210 may be configured according to a user profile of the first system enabled device 110, as shown by block 480. For example, the voice authentication described above may identify a user of the wireless media rendering system 100, and the first system enabled device 110 may access the user profile of this user to configure media rendering parameters of the second system enabled device 210. This may be accomplished by the first system enabled device 110 sending configurations commands to the second media rendering device, either via the WLAN 150 or the communication channel 215. Alternatively, wireless media rendering system 100 may provide access for the user profile to the second system enabled device 210, so that the second system enabled device 210 may configure its media rendering parameters directly from the user profile. For example, the wireless media rendering system 100 may transmit the user profile to the second media rendering device, or the wireless media rendering system 100 may provide the second system enabled device 210 access to the user profile that is stored elsewhere in the system, for example, in the first system enabled device 110, the smart phone 120, or the cloud storage 160 via the cloud server 140.

Other authentication/provisioning scenarios of the second system enabled device 210 are possible. For example, in an alternative embodiment, the second system enabled device 210 may include a microphone and an audio transducer (speaker). When the second system enabled device 210 is turned on, the second system enabled device 210 queries the user (for example, via the audio transducer) to state his name. When the user states his name, the second system enabled device 210 records the voice of the user via the microphone. The second system enabled device 210 may process the voice recording to derive voice biometrics of the user. The second system enabled device 210 provides the voice biometrics to the first system enabled device 110. The newly gathered voice biometrics may be compared with previously stored voice biometrics to determine whether the user for the second system enabled device 210 is the same as the voice of the user providing the voice for the newly gathered voice biometrics.

It should be noted that there may be more than one user associated with the wireless media rendering system 100. In this case, the wireless media rendering system 100 may compare the newly recorded voice with a previously recorded voice and/or previously stored voice biometrics of each of the system users to determine whether the voice of the new recording matches one of the users.

Portions of the provisioning of the first device may be accomplished via language recognition. For example, a speaker in the first system enabled device 110 may recite a question and a limited number of answers, and recognize one of the answers spoken by the user to make a provisioning selection. Likewise, the first system enabled device 110 may prompt the user to name the second system enabled device 210.

The wireless media rendering system 100 may be modular, so additional system enabled devices 110, 210 may be added over time to expand functionalities of the wireless media rendering system 100. For example, the wireless media rendering system 100 may begin with a first single audio transducer for rendering media in mono, and a second media rendering device may include a second single audio transducer, where it may be desirable to configure the first and second single audio transducers to operate as a stereo pair. Similarly, a third device, for example, a subwoofer, may be added to the stereo pair. Not all the media rendering devices need be audio components, for example, video components, and/or hybrid audio and video components. When a new media rendering device is added to the wireless media rendering system 100, the wireless media rendering system 100 may prompt the user with one or more configuration options available for the new media rendering device, for example, using voice prompts.

The first system enabled device 110 may search for devices configured to operate with the wireless media rendering system 100 in the WLAN 150, for example, via Bluetooth or a sub-network. The first system enabled device 110 may then discover the second system enabled device 210, and announce via a speaker that it has detected a new device (namely, the second system enabled device 210), and query whether the user wishes the second system enabled device 210 to join the media rendering system 200.

While the above embodiments include a media rendering system, in alternative embodiments this voice authentication and provisioning is applicable to many other scenarios and systems.

Once one or more system enabled devices 110, 210 have been configured, the wireless media rendering system 100 may be configured to differentiate the identity of two or more system users via biometrics, so that a spoken command may be analyzed both to recognize the text content of a spoken command, and to associate the speaker of the command with a specific user. For example, a user may say "Play my playlist," and the wireless media rendering system 100 may identify who the user is, and select a playlist associated with that user for rendering. Therefore, the manner in which a command is executed may be affected by the identity of the user recognized as issuing the command. The execution of the command may further be affected by one or more stored preferences of the user who issued the command.

Figure 5:
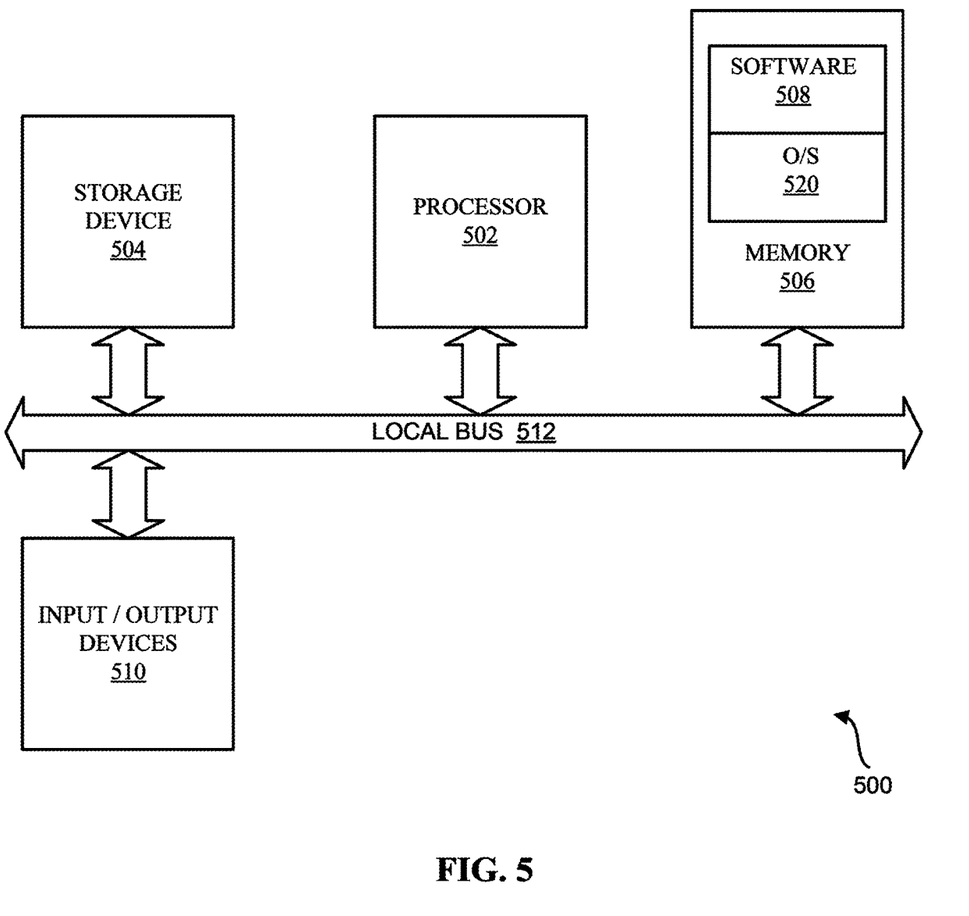
FIG. 5 is a schematic diagram illustrating an example of a system for executing functionality of the present invention.

As previously mentioned, the present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The above embodiments may provide increased convenience and security for wireless media rendering devices entering a previously provisioned media rendering system. Advantageously, the system addresses issues regarding configuring a newly added media rendering device in an environment where two or more media rendering systems may be operating within two or more overlapping WLANs, for example the WLAN of a user and the WLAN of a neighbor in an apartment building. The embodiments provided for simplified configuration of the new device while ensuring the new media rendering device is provisioned for the selected media rendering system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for configuring a second media rendering device to communicate with a first media rendering device of a media rendering system in a wireless local area network (WLAN), comprising the steps of:
   wirelessly detecting the second media rendering device of the media rendering system by the first media rendering device;
   establishing a communication channel between the second media rendering device and the first media rendering device via a communication protocol proprietary to the media rendering system;
   after establishing the communication channel via the proprietary communication protocol, authenticating a user of the second media rendering device, further comprising the steps of:
      accessing biometric user data of a first user of the media rendering system;
      recording an audio voice phrase of the user of the second media rendering device;
      analyzing the audio voice phrase of the user of the second media rendering device to compare the audio voice phrase of the user of the second device to the biometric user data of the first user of the media rendering system; and
      authenticating the audio voice phrase with respect to the biometric user data; and
   based on the authenticating:
      configuring the second media rendering device to communicate via the WLAN; and
      configuring the second media rendering device to render media according to a first user profile of the first user of the media rendering system,
   wherein the communication channel is provided by a soft access point of the first media rendering device.

2. The method of claim 1, further comprising the step of powering on the second media rendering device within wireless range of the wireless communication network.

3. The method of claim 1, wherein the communication channel is provided via an ad hoc network.

4. The method of claim 3, wherein the ad hoc network comprises a BlueTooth network.

5. The method of claim 1, further comprising the step of selecting the biometric user data of the first user of the media rendering system over the biometric user data of a second user of the media rendering system based on the audio voice phrase of the user of the second media rendering device.

6. The method of claim 5, wherein the audio voice phrase comprises a non-verbal utterance.

7. The method of claim 1, further comprising the steps of:
   determining that no other media rendering system device is communicating via the WLAN;
   configuring a user profile on the first media rendering device;
   receiving a voice pass phrase from the user; and
   deriving the biometric user data of a user of the first media rendering device based on the voice pass phrase.

8. The method of claim 7, wherein the first media device comprises a WLAN access point.

9. The method of claim 7, wherein the first media device comprises a microphone configured to receive the voice pass phrase.

10. The method of claim 1, further comprising the steps of
    accessing biometric user data of a second user of the media rendering system; and
    analyzing the audio voice phrase of the user of the second media rendering device to compare the audio voice phrase of the user of the second device to the biometric user data of the second user of the media rendering system.

11. A media rendering system comprising:
    a second media rendering device; and
    a first media rendering device configured to communicate via a first wireless local area network (WLAN) configured to perform the steps of:
       wirelessly detecting the second media rendering device;
       establishing a communication channel with the second media rendering device via a communication protocol proprietary to the media rendering system;
       after establishing the communication channel via the proprietary communication protocol, authenticating a user of the second media rendering device, further comprising the steps of:
          accessing biometric user data of a first user of the media rendering system;
          recording an audio voice phrase of the user of the second media rendering device;
          analyzing the audio voice phrase to compare the audio voice phrase to the biometric user data of the first user of the media rendering system; and
          authenticating the audio voice phrase with respect to the biometric user data; and
       based on the authenticating,
          configuring the first media rendering device to communicate via the WLAN; and
          configuring the second media rendering device to render media according to a first user profile of the first user of the media rendering system,
    wherein the communication channel is provided by a soft access point of the first media rendering device.

12. The system of claim 11, further comprising a portable computing device configured to communicate with the first media rendering device via the WLAN, wherein the portable computing device is configured to control the first media rendering device.

13. The system of claim 12, wherein the portable computing device is configured to provide a graphical user interface for controlling the first media rendering device.

14. The system of claim 11, wherein the first media rendering device is further configured to perform the steps of:
    determining that no other media rendering system device is communicating via the WLAN;
    configuring a user profile on the first media rendering device;
    receiving a voice pass phrase from the user; and
    deriving the biometric user data of a user of the first media rendering device based on the voice pass phrase.

15. A first media rendering device comprising:
    a network interface configured to communicate via a first wireless local area network (WLAN); and a processor and a memory configured to store non-transitory instructions that when executed by the processor perform the steps of:
   wirelessly detecting a second media rendering device of a media rendering system;
   establishing a communication channel with the second media rendering device via a communication protocol proprietary to the media rendering system;
   after establishing the communication channel via the proprietary communication protocol, authenticating a user of the second media rendering device, further comprising the steps of:
   accessing biometric user data of the user of the first media rendering device;
   recording an audio voice phrase of a user of the second media rendering device;
   analyzing the audio voice phrase to compare the audio voice phrase to the biometric user data of the user of the first media rendering device;
   authenticating the audio voice phrase with respect to the biometric user data; and
   based on the authenticating, configuring the second media rendering device to communicate via the WLAN, and configuring the second media rendering device to render media according to a user profile of the user of the first media rendering device,
   wherein the communication channel is provided by a soft access point in the first media rendering device and/or an ad hoc network.

16. The device of claim 15, further comprising the step of powering on the second media rendering device within wireless range of the wireless communication network.

17. The device of claim 15, further comprising the step of selecting the
   biometric user data of the first user of the media rendering system over the biometric user data of a second user of the media rendering system based on the audio voice phrase of the user of the second media rendering device.

18. The device of claim 15, further comprising the steps of:
   determining that no other media rendering system device is communicating via the WLAN;
   configuring the user profile on the first media rendering device;
   receiving a voice pass phrase from the user; and
   deriving the biometric user data of a user of the first media rendering device based on the voice pass phrase.

19. The device of claim 18, further comprising a WLAN access point.

20. The device of claim 18, wherein the first media device comprises a microphone configured to receive the voice pass phrase.

* * * * *